UNITED STATES PATENT OFFICE.

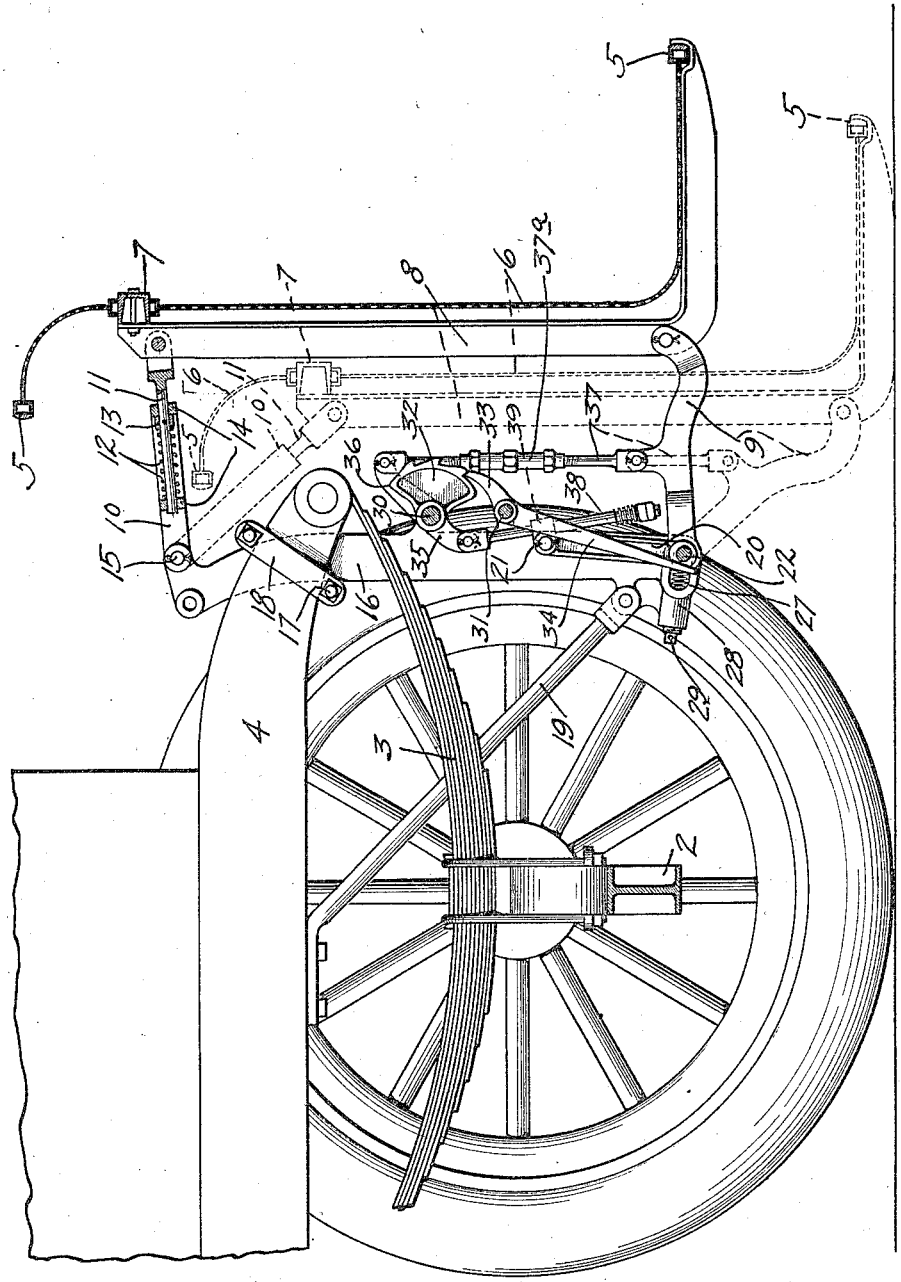

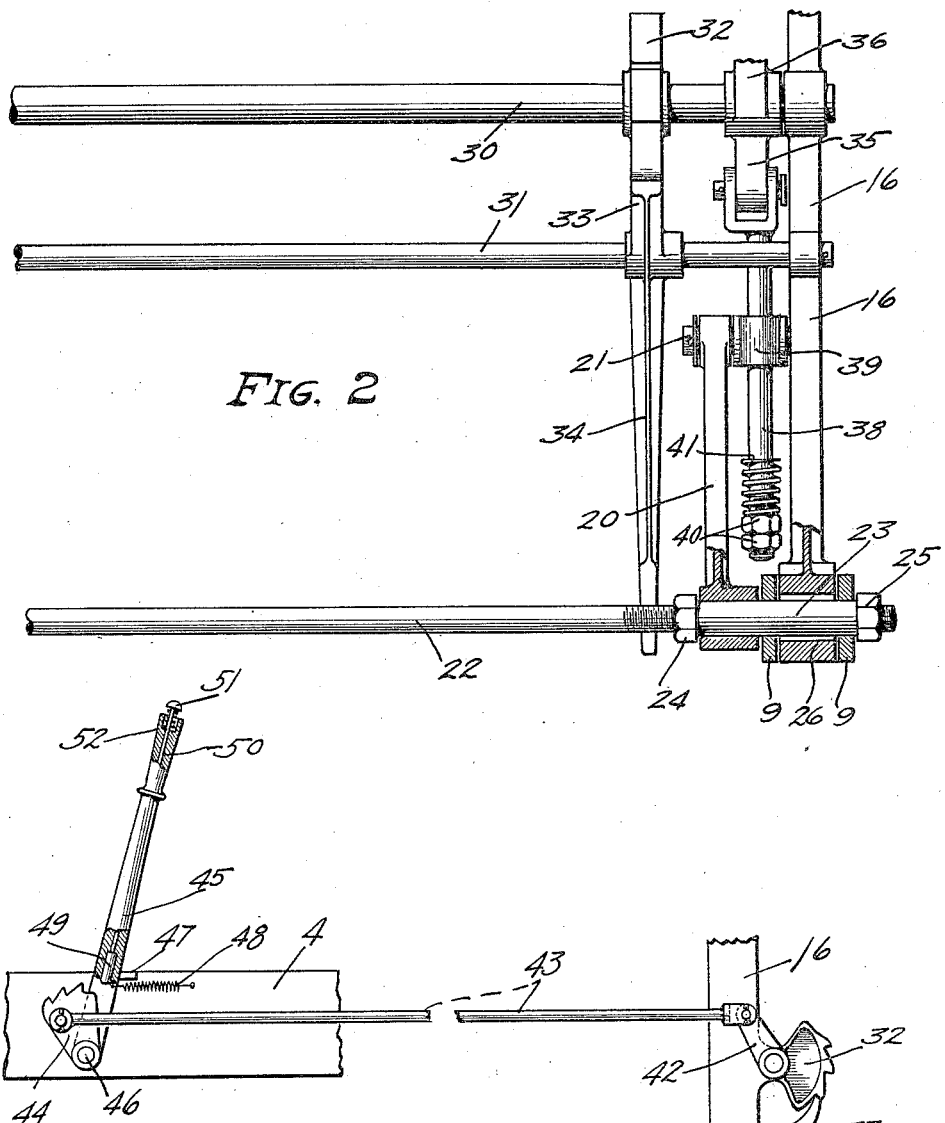

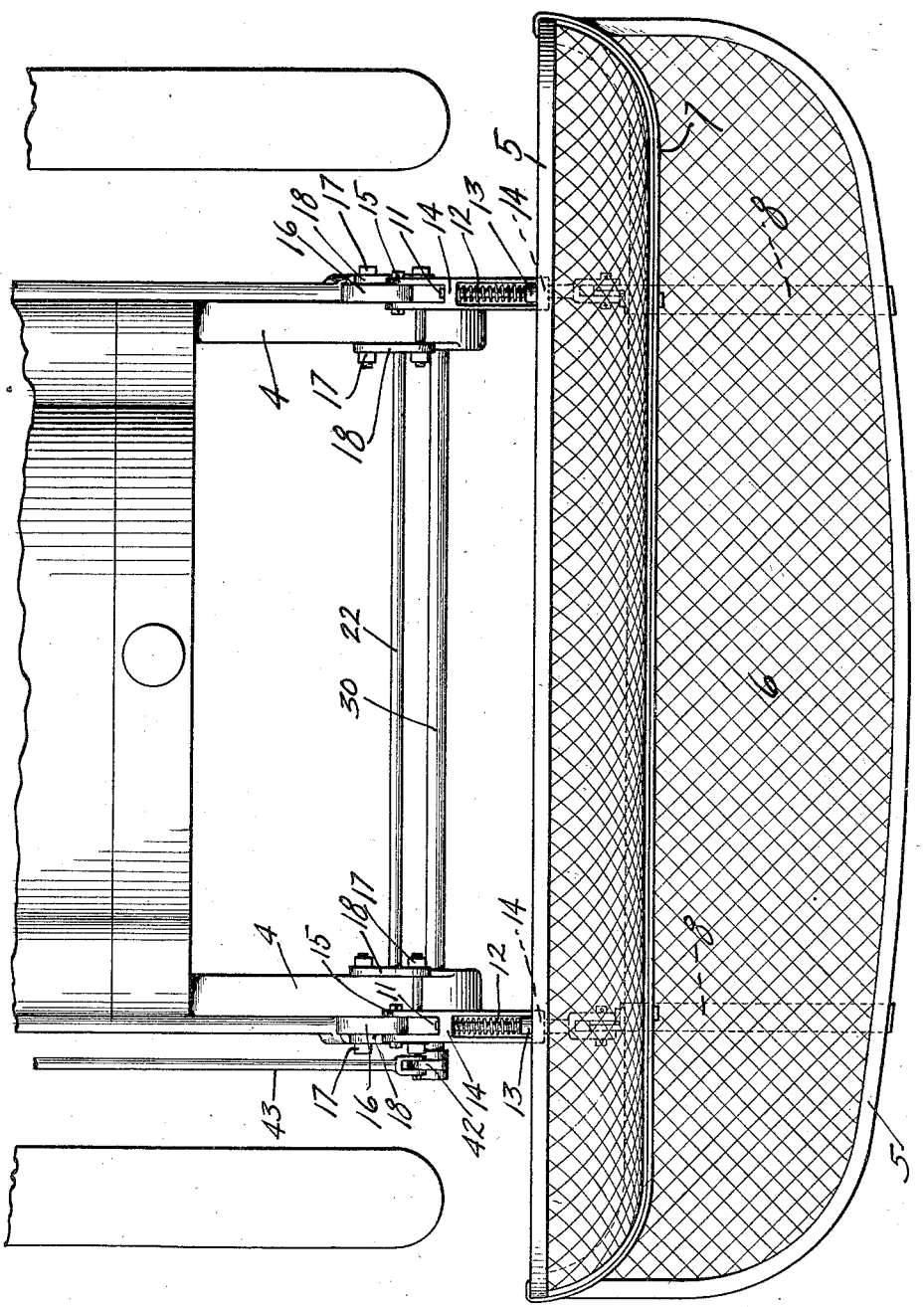

WILLIAM A. LINQUIST AND HENRY CHRISTOPHER, OF MINNEAPOLIS, MINNESOTA, ASSIGNORS, BY DIRECT AND MESNE ASSIGNMENTS, TO BERTRICE E. LINQUIST, OF MINNEAPOLIS, MINNESOTA.

AUTOMOBILE-FENDER.

1,182,282.  Specification of Letters Patent.  Patented May 9, 1916.

Application filed September 24, 1915. Serial No. 52,425.

*To all whom it may concern:*

Be it known that we, WILLIAM A. LINQUIST and HENRY CHRISTOPHER, citizens of the United States, residing at Minneapolis, in the county of Hennepin and State of Minnesota, have invented certain new and useful Improvements in Automobile-Fenders; and we do hereby declare the following to be a full, clear, and exact description of the invention, such as will enable others skilled in the art to which it appertains to make and use the same.

Our present invention relates to automatic fenders, and is in the nature of an improvement on or refinement of the construction disclosed and claimed in the pending application of William A. Linquist, S. N. 33,476, filed June 11, 1915, entitled "Automobile fenders."

Generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a side elevation with some parts sectioned and some parts broken away, showing the improved fender applied to an automobile or motor propelled vehicle; Fig. 2 is a detail in front elevation showing on an enlarged scale, certain of the fender supporting and operating connections; Fig. 3 is a fragmentary side elevation showing particularly, the means for raising the fender and securing the same at different elevations; and Fig. 4 is a plan view showing the front portion of the vehicle and the fender applied thereto.

Of the parts of the automobile, the numeral 1 indicates the front wheels, the numeral 2 the front axle, the numeral 3 the fender springs, and the numeral 4 the front bars, which latter are supported on the springs 3 in the customary way. As preferably constructed, the fender proper comprises a marginal frame 5 bent into rectangular form and having an L-shaped outline when viewed from the side of the machine. This frame is provided with a netting or filler 6 suitably secured thereto. The frame 5 has a transverse bar 7 located near its upper portion. The transverse lower and forwardly located bar of the frame 5 and the transverse upper bar 7 are rigidly secured, respectively, to the lower and upper portions of L-shaped brackets 8, the horizontal forwardly projected portions of which serve as ground-engaging shoes when the fender is permitted to drop onto the ground. As shown, the said brackets 8 are T-shaped in cross section, and the webs of their vertical portions are pivotally connected to approximately parallel forwardly projected lower links 9 and upper links 10 and 11. For an important purpose, to-wit, to give a yielding action to the upper portion of the fender, the upper links are made up of two sections 10 and 11 that have a telescoping or sliding movement, one on the other, to normally extend forward by coiled springs 12 that surround the stems of the sections 11 and are compressed between collars 13 on the said stems and the rearmost members of the lugs 14 formed on the members 10 through which the stems of the members 11 are mounted to slide. The collars 13, by engagement with the forward lugs 14, limit the forward extending movements of the said upper links. The rear ends of the link sections 10 are pivoted at 15 to the upper ends of upright fender supporting frames 16. These frames 16, near their upper ends, are rigidly but adjustably clamped to the front ends of the frame bars 4, by nut-equipped bolts 17 and coöperating straps 18, the lower ends of the said frames 16 are braced and connected to the frame bars 4, by oblique thrust bars or rods 19.

As a highly important feature of the present invention, the rear ends of the lower links 9 are pivotally connected to the lower ends of supporting links 20, the upper ends of which are pivoted on studs 21 projected inward from the intermediate lower portions of the frame 16. In this way, the rear ends of the lower links 9 are supported for movement under a friction so slight that it is negligible.

As a further highly important feature, the pivotal connection between the links 9 and 20 is made by a transverse tie rod 22 (see particularly Fig. 2), that has threaded ends with sleeves 23 and nuts 24 and 25 thereon, and the said sleeves 23 are passed through the lower ends of the supporting links 20 and through the pronged rear ends of the links 9, and are also passed with very considerable clearance through slots 26 formed in the extreme lower ends of the frames 16. Here it will be noted that the sleeves 23 do not have contact with the upper and lower walls of the slots 26, but nevertheless, that the said slots, by limiting the forward and rearward movements of the said sleeves, limit the direct forward and rearward movements of the fender, by permitting sufficient movement of the lower portion of the said fender to trip the fender lock or latch, as will presently appear. Coiled springs 27 seated in sleeve-like hubs 28 on the lower ends of the frames 16, project into the slots 26 and yieldingly press against the sleeves 23, thereby yieldingly holding the lower portion of the fender normally projected forward. As shown, adjustable plugs 29 applied to the sleeves 28 afford means for adjusting the tension of the cushioning springs 27. Here it may be further noted that the rod 22 and nuts 24 and 25 serve to hold the pivotally connected ends of the links 9 and 20 against lateral spreading movements, both in respect to the adjacent members and to those that are on opposite sides of the machine.

Located high above the tie rod 22 and mounted in the bearing frames 16 are rock shafts 30 and 31, the former of which is above the latter. Rigidly secured on the upper rock shaft 30 inward of each frame 16 is a lock segment 32 shown as provided with three teeth. Secured to the rock shaft 31 for coöperation with each lock segment 32 is a lock dog 33 having a long depending tripping arm 34, the lower end of which is in position to be engaged by the tie rod 22, when the latter is pressed rearward, so that the said rod 22 is caused to serve as a tripping rod. The rock shaft 30 is provided with rigidly secured arms 35 and 36 shown as located between the adjacent frame 16 and lock segments 32. The arms 36 are pivoted to the upper ends of connecting rods 37, the lower ends of which are pivoted to the intermediate portions of the lower fender supporting links 9. These connecting rods 37 are made longitudinally adjustable by turn buckles 37ª that work on threaded ends of the sections of the said rods. The adjustment of the said rods 37 makes it possible to true up the fender and vary its vertical adjustment considerably, irrespective of the vertical adjustments made possible by different engagement of the lock segments 32, in respect to the lock dogs 33. The arms 35 of the rock shaft 30 are pivoted to the upper ends of stop bolts 38 that slide freely through guide blocks 39 that are pivoted on the studs 21, and, as shown, are located between the bearing frames 16 and suspending links 20. On the lower ends of these stop bolts 38 are stop nuts 40 that support coiled buffer springs 41 placed around the lower ends of the stop bolts 38 and adapted to engage with the guide blocks 39 when the fender is dropped.

There is also provided an improved means for raising the fender after it has been tripped, and in the application of this device, the rock shaft 30 is provided at one end, to-wit, as shown, at its right hand end, with a short arm 42 to which the front end of a rearwardly extended rod 43 is pivoted. The rear end of this rod 43 is pivoted to a so-called re-setting segment 44, which, as shown, has three teeth to correspond with the teeth of the lock segments 32, and is carried by a lever 45 pivoted at 46 to the intermediate portion of one of the frame bars 4. This lever 45 is normally held forward against a stop 47 on the bar 4, by a coiled spring 48. For engagement with the end of the re-setting segment 44, the lever has a normally retracted dog in the form of a plunger 49, the stem 50 of which extends axially through the lever, and at its upper end, has an exposed thumb piece 51 between which, and the head of the lever, a light coiled plunger retracting spring 52 is compressed.

Operation: In Fig. 1, the full lines show the fender set in its highest position or greatest elevation above the ground. When the fender is to be raised from the ground, the operator presses the dog 49 of the lever 45 downward so that it will engage the first tooth of the segment 44, and then by the rearward movement of the lever, raise the fender until the first notches of the lock segments 32 engage with the lock dogs 33. By repeating the above noted lever movements and engaging the dog 49, one after the other with the teeth of the segment 44, the fender can be raised until, if desired, the last or lowest notches of the lock segments 32 are engaged with the lock dogs 33. Under the forward movement of the machine, when the lower portion of the fender strikes a person or object, it will be caused to oscillate rearwardly and swing the supporting links 20 and tripping rod 22 rearward against the tension of the springs 27. This movement, as already pointed out, will take place under very slight frictional resistance due to the manner in which the links 30 support the raised ends of the lower links 9. The rearward movement of the tripping bar 22, acting through the tripping arms 34, will rock the shaft 31 to sufficiently throw the lock dogs 33 out of engagement with the end of the lock segments 32; and this will take place, regardless of whether or not both sides of the fender are simultaneously forced rearward or whether only one side is forced rearward.

When the lock segments 32 are raised from the lock dogs 33, the fender will drop by gravity into the dotted line position, Fig. 1, and in thus dropping, will move rearward so that the fender will have a chance to get in under the person or object struck. The stop nuts 40 on the stop rods 39 may be so adjusted that the horizontal runner forming portions of the fender frames 8 will strike the ground, or may be stopped a little above the ground. In any event, the buffer springs 41 will cushion the downward movements of the fender. Obviously, when the fender drops, the stop rods 38 are moved upward through the bearing blocks 39.

Normally, the fender, when supported in a raised position, is yieldingly pressed forward by the springs 27, and the links 20 hold the rear ends of the lower fender supporting links 9 with the greatest freedom for rearward swinging movements, whenever the lower portion of the fender strikes a person or object and there is no sliding contact between any of the parts. This makes the tripping mechanism very sensitive, and easily operated, so that the fender will be instantly released by a very light contact. In practice, we have found gravity alone sufficient to insure the downward movement of the fender when it is released, but, of course, when found desirable, springs for assisting the action of gravity and drawing the fender downward when released, may be provided. The endwise yielding action of the upper links 10 is important because it affords a good cushion lessening the shocks produced when a person or object strikes or is thrown against the upper portion of the fender. The springs 27 have a similar function in respect to the lower portion of the fender, so that it will be seen that the fender is supported for limited rearward movements, both at its upper and lower portions.

What we claim is:

1. In a vehicle fender, the combination with supports therefor, of a fender body, suspending links pivoted to said supports, and means supporting said fender from said supports and including lower links pivoted to said fender and to the free portions of said suspending links.

2. In a vehicle fender, the combination with supports therefor, of a fender body, suspending links pivoted to said supports, means supporting said fender from said supports and including lower links pivoted to said fender and to the free portions of said suspending links, and a lock for holding said fender in a raised position, arranged to be tripped by initial rearward movements of the said lower links.

3. In a vehicle fender, the combination with supports therefor, of a fender body, suspending links pivoted to said supports, means supporting said fender from said supports and including lower links pivoted to said fender and to the free portions of said suspending links, a rock shaft mounted on said supports, a lock element on said rock shaft, and a lock dog carried by said supports and normally engaging the said lock element to hold said fender raised, said lock dog having an arm arranged to trip said dog under initial rearward movement of said lower links.

4. In a vehicle fender, the combination with supports therefor, of a fender body, suspending links pivoted to said supports, means supporting said fender from said supports and including lower links pivoted to said fender and to the free portions of said suspending links, and springs applied to the lower portions of said supports and yieldingly pressing the said lower links and the lower portion of said fender forward.

5. In a vehicle fender, the combination with supports therefor, of a fender body, suspending links pivoted to said supports, means supporting said fender from said supports and including lower links pivoted to said fender and to the free portions of said suspending links, a lock for holding said fender in a raised position, arranged to be tripped by initial rearward movements of the said lower links, and springs applied to the lower portions of said supports and yieldingly pressing said lower links forward.

6. In a vehicle fender, the combination with supports therefor, of suspending links pivoted to said supports at their upper ends, forwardly extended upper and lower links pivotally connected to said fender at their front ends, the upper links being pivoted to said supports at their rear ends, and said lower links being pivoted to said suspending links at their rear ends, springs yieldingly pressing said lower links forward, a lock element having a pivotal movement in respect to said supports and connected to said lower links, and a lock dog carried by said supports and coöperating with said lock element to hold the fender in a raised position, said lock dog having a depending trip arm arranged to be operative under initial rearward movement of the lower portion of the fender to trip said dog.

7. In a vehicle fender, the combination with fender supports, of suspending links pivoted to said fender supports at their upper ends, forwardly extended upper and lower links pivoted to said fender at their front ends, the upper links being pivoted to said supports at their rear ends, a tripping rod pivotally connecting the rear ends of said lower links to the lower ends of corresponding suspending links, springs applied to said fender supports and yieldingly pressing the said lower links forward, a rock shaft mounted on said supports and provided with a lock element, an arm on said rock shaft, a connecting rod between said arm and said lower links, a lock dog pivotally carried by said supports and coöperating with said lock element to hold the fender in a raised position, said lock dog having a depending trip arm arranged to be engaged by said cross tripping rod, to release said dog under initial movement of the lower links, and springs yieldingly pressing said lower links forward.

8. In a vehicle fender, the combination with fender supports, of suspending links pivoted to said fender supports at their upper ends, forwardly extended upper and lower links pivoted to said fender at their front ends, the upper links being pivoted to said supports at their rear ends, a cross rod pivotally connecting the rear ends of said lower links to the lower ends of said suspending links, springs applied to said fender supports and yieldingly pressing the said lower links forward, a rock shaft mounted on said supports and provided with a lock element, an arm on said rock shaft, a connecting rod between said arm and said lower links, a lock dog pivotally carried by said supports and coöperating with said lock element to hold the fender in a raised position, said lock dog having a depending trip arm arranged to be engaged by said tripping rod, to release said dog under initial movement of the lower links, springs yieldingly pressing said lower links forward, an arm on said rock shaft, a stop rod pivotally connected to said arm, a guide for said stop rod carried by one of the fender supports, and a stop element, on said stop rod, engageable with said guide.

9. In a vehicle fender, the combination with supports therefor, of a fender body, forwardly extended upper and lower links connecting said fender to said supports, the upper link connections having spring elements for cushioning the rearward movement of the upper portion of the fender, a lock for securing said links with said fender raised, and a trip for said lock.

10. In a vehicle fender, the combination with supports therefor, of suspending links pivoted to said supports, forwardly extended lower links connecting said suspending links to the lower portion of said fender, and endwise resilient upper links connecting the upper portion of said fender to said fender supports.

11. In a vehicle fender, the combination with supports therefor, of a fender body, suspending links pivoted to and depending from said supports, lower links connecting the lower portion of said fender to said suspending links, springs pressing said suspending links and lower links forward, endwise resilient upper links connecting the upper portion of said fender to said fender supports, a lock for securing said fender in a raised position, and a tripping device for said lock arranged to be operated by rearward movements of said fender and lower links.

12. The combination with fender supports, a fender body and connections supporting said body from said supports for raising and lowering movements, of means for holding said fender in a raised position comprising a lock segment, a lock dog coöperating with said lock segment, fender actuated means for tripping said lock dog, a lifting segment connected to said lock segment, and a lever coöperating with said lifting segment, and provided with a dog for engagement therewith.

13. The combination with fender supports, a fender body, links connecting said fender body to said supports for vertical movements, of a multiple-toothed lock segment connected to certain of the said links for raising and lowering said fender body, a multiple-toothed lifting segment connected to said lock segment, and a lifting lever having a dog coöperating with the teeth of said lifting segment.

In testimony whereof we affix our signatures in presence of two witnesses.

WILLIAM A. LINQUIST.
HENRY CHRISTOPHER.

Witnesses:
HARRY D. KILGORE,
F. D. MERCHANT.